Dec. 26, 1950 C. W. HANSELL 2,535,793

MAGNETRON

Filed Jan. 8, 1946

INVENTOR
CLARENCE W. HANSELL.
BY H. S. Grover
ATTORNEY

Patented Dec. 26, 1950

2,535,793

UNITED STATES PATENT OFFICE 2,535,793

MAGNETRON

Clarence W. Hansell, Port Jefferson, N. Y., assignor to Radio Corporation of America, a corporation of Delaware Application January 8, 1946, Serial No. 639,736

24 Claims. (Cl. 179—171)

This invention relates to electron discharge devices or vacuum tubes and amplifiers utilizing such devices, and particularly to such devices of the magnetron type in which there is employed a magnetic field.

For repeaters in a radio relay system, there is a need for high gain amplifiers to operate at frequencies above 500 megacycles. It is desirable in these relay systems to use frequency modulation of the carrier current and to provide for amplitude limiting in each repeater. The problems involved are discussed in my article entitled "Radio Relay Systems Development by The Radio Corporation of America," published in the Proc. I. R. E. March 1945, pages 156 to 168. The maximum gain per repeater is expected to range from about 70 to 100 decibels, and the best obtainable signal to thermal agitation and shot effect noise level is desired. The maximum output is expected not to exceed about 200 watts at 500 megacycles and may vary with the operating frequency. In a 500 mile system, such as would be required to extend from Boston to Washington, the total amplification of all the repeaters in cascade is expected to be on the order of 1000 decibels or more, plus about 150 to 200 decibels of additional gain to provide amplitude limiting in the repeaters.

One of the oustanding problems is that of keeping adequately low amplitude and phase distortion of the modulation. This distortion is primarily due to the amplitude and phase response characteristics of coupling circuits between vacuum tubes, of which there would be a great number in cascade if conventional practice were followed.

With conventional styles of vacuum tubes it may be possible to obtain 10 decibels amplification per tube when a nearly flat amplitude response characteristic and a nearly linear phase shift (constant time delay) characteristic in the repeater system is provided, in which case there will be required about 120 or more coupling circuits in cascade. At the present time there are no existing commercial tubes for television band widths which permit obtaining as much as 10 decibels gain per tube simultaneously with low distortion when 120 or more tubes are operated in cascade. For a gain of 100 decibels per repeater, about eleven coupling circuits would be required in each repeater.

There is, therefore, great need for a type of amplifier in which either cascade or continuous amplification is obtainable without requiring any coupling circuit except at the input and output ends of each repeater. The present invention is designed to satisfy this need and provides a relatively high gain repeater with only two coupling circuits, one at each end of the repeater.

An object of the invention is to provide a means of controlling the frequency of relatively large output power by means of relatively small input power in simple manner and with a minimum of coupling circuits.

Another object of the invention is to provide a radio frequency electron discharge device amplifier tube which has relatively large gain.

A further object is to control the frequency of a magnetron of one energy rating from the electron stream produced by another magnetron of smaller energy rating.

A still further object is to provide an electron discharge device having a pair of spaced magnetrons located within a single evacuated envelope and in which one magnetron controls the other magnetron through electron coupling.

An exposition of the principle underlying the present invention will now be given. Let it be assumed that there are two double anode magnetrons both adjusted to the same operating frequency but one relatively small, operating at relatively low potential and current, and the other large, operating at relatively high potential and current. The large one could provide relatively large output power but would not be as sensitive to input synchronizing power as the small magnetron would be. The small one, on the other hand, if it were small enough and were adjusted at the critical point as to whether it would oscillate or not, can be synchronized and made to oscillate by a very small amount of power from outside sources. By arranging a whole series of magnetrons end-to-end within a single evacuated envelope, with the magnetrons ranging in size from the smallest to the largest, they can be coupled together by the space charge so that each magnetron controls and synchronizes the operation of the next. A more preferable arrangement would be a single coupling device with a continuously tapering size of the space charge, and preferably with some means of making the control exerted from the smaller to larger regions greater than the control in the reverse direction.

The present invention makes use of the foregoing principle and employs a whirling electron stream tapering in diameter, current and energy and extending from a small magnetron at one end of the envelope to a magnetron of larger energy rating located at the other end of the envelope, and in which stream there is developed a condition of unstable equilibrium tending to make each elemental length of the stream increase disturbances in itself and to oscillate at the input and output frequency. By way of analogy, I propose the use of two magnetrons in the same enevelope, one of which can be said to be a driver tube or master oscillator controlling the frequency of the other.

A more detailed description of the invention follows in conjunction with a drawing, wherein:

Fig. 1 illustrates a cross-section of one embodiment of a magnetron amplifier in accordance with the invention;

Fig. 1*a* is an illustration of the space charge within the magnetron of Fig. 1 and illustrates how lack of symmetry of space charge distribution around the filament tends to grow to a limiting value;

Figure 1:
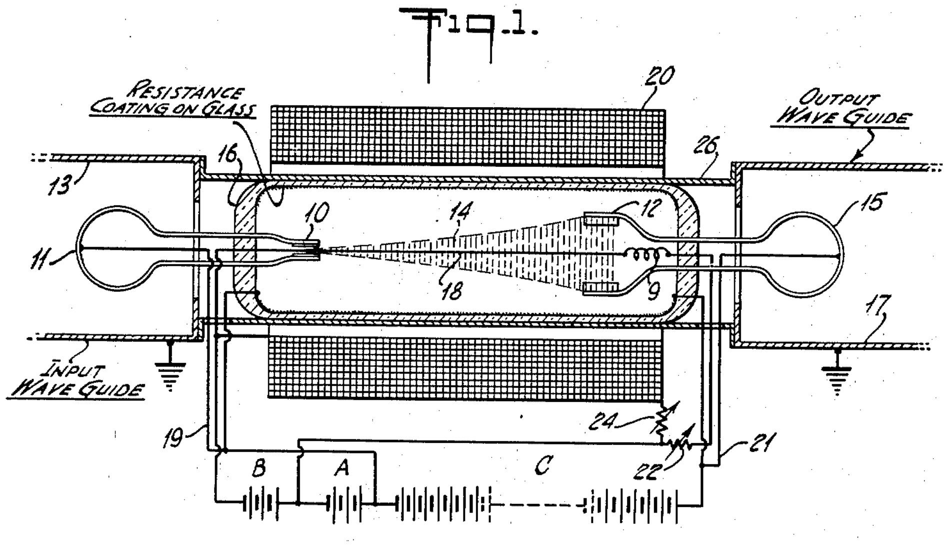
Figure 2:
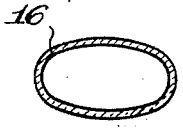
Fig. 2 is a cross-section of the envelope of Fig. 1 and shows an ellipse with the long axis of the ellipse at right angles to the cross-section of the tube shown in Fig. 1.

Referring to Fig. 1 in more detail, there is shown an electron discharge device having within a single evacuated glass envelope 16 a relatively small magnetron section 10 at one end of the envelope and a large magnetron section 12 at the other end of the envelope, with a regenerative growing wave electron coupling stream 14 between them. The glass envelope is flattened to give a more or less elliptical cross-section with the long axis at right angles to the showing of Fig. 1, as illustrated in Fig. 2, for reasons described hereinafter.

A common filament 18 passes through the longitudinal axis of the tube and is heated by a battery B through a metallic tension spring 9. This tension spring serves to take care of the expansion of the filament wire. Surrounding the envelope is a metal shield 26 which serves as a high pass filter having a cut-off higher in frequency than the amplifier operating frequency. This shield is, in turn, surrounded by a magnetic field coil 20 which is supplied with direct current by battery B. The filament and field coil circuits are provided with rheostats 22 and 24, respectively.

Each magnetron section comprises a segmented electrode structure in the form of a pair of spaced semi-cylindrical anode electrodes. Obviously, other known types of segmented electrode structures can be used. The anodes of the small magnetron section 10 are coupled to opposite ends of an input coupling loop 11 positioned within a wave guide 13 supplying input waves to be amplified. The larger energy rating section 12 has its anodes coupled to opposite ends of an output coupling loop 15 positioned within an output wave guide 17, in turn coupled to a suitable utilization circuit (not shown). The anodes of both magnetrons are supplied with direct current potential from any suitable power sources, illustrated in Fig. 1 as batteries A and C whose terminals are connected respectively to the midpoints of coupling loops 11 and 15 via connections 19 and 21.

The input or driving magnetron 10 is preferably of smaller physical dimensions than the output or controlled magnetron 12, as shown, although it should be understood that in certain situations it may be possible to design both magnetron sections to have the same physical dimensions. In all cases, however, the input magnetron 10 should have a smaller potential-current or energy rating than the output magnetron 12 where amplification is desired.

In one mode of operation, the magnetic field strength is adjusted to make the natural period of push-pull electronic oscillation of the small anode section correspond to the input frequency. Roughly, the value of magnetic field oersteds (gauss) will be on the order of the frequency in megacycles divided by 2.3. At 1000 megacycles, the magnetic field may be of the order of 435 oersteds. The small anodes are provided with a relatively low direct current potential below the cut-off potential and the value adjusted for sensitive response to the input power supplied by the input wave guide 13. In other words, the negative resistance of the small magnetron 10 is adjusted to some point in the vicinity of the starting point of oscillations. The filament temperature must also be adjusted to hold a correct and nearly constant electron emission. It will thus be seen that the output frequency is equal to the input frequency, and that the frequency of operation in this one mode of operation is determined by the magnetic field.

In the other range of operation at frequencies far below the electron resonance or high frequency value of operating frequency, there is no correlation between magnetic field and frequency other than that the magnetic field and anode-to-cathode potentials must be properly coordinated. In this low frequency range the input and output frequencies are equal but may be anywhere over a very large range.

The glass envelope 16 between the two sets of magnetrons 10 and 12 is coated with a thin coating of resistance material (similar to a metallized resistor) and a potential varying with position is established across this material from one end of the envelope to the other, resulting in a potential between the resistance material and the filament which is smaller near the small magnetron 10 and higher as the distance increases toward the larger magnetron 12. This results in a motion of electrons in a direction parallel to the filament, toward the large magnetron 12, as the electrons loop out from the vicinity of the filament and back to it. Also, the electric field between the envelope 16 and the filament 14 increases in the direction toward the large anode. This results in an increasing radial motion of the electrons, so that the oscillating space charge is of small radius at the small anodes of magnetron 10, but increases as the space charge passes along the filament to the big anodes of the larger magnetron 12. In addition, electrons emitted at any point on the filament tend to move continuously toward the large magnetron 12 and to accumulate continuously in number so that the whole length of the filament is effective in adding to the space charge at the anodes of the large magnetron 12. The tapering lines 14 shown above and below the filament 18 indicates generally the shape of the whirling electron stream extending from the small magnetron section to the large magnetron section.

In the tube of Fig. 1, assuming that a synchronized fluctuation or wave of space charge is produced on the small magnetron section 10 due to the application of input waves to the two small anodes, this fluctuation is propagated toward the large anodes of magnetron 12, growing in current and potential on the way. By making the negative resistance effect greater as the large magnetron 12 is approached by this wave of space charge, in the design and adjustment of the tube and magnetic field, the large anodes may be caused to oscillate strongly on their own account but to be controlled in frequency by the input to the small anodes.

It may be noted that the push-pull regenerative effect along the electron stream does not require the presence of double electrodes to regenerate or oscillate. The space charge itself can act upon the electric fields near the filament to produce the negative resistance effect. Because the electrons leaving any point on the filament are made to travel into regions of successively higher potential, it is not necessary to provide intermediate electrodes for receiving this charge. This charge is continuously removed from each region along the filament without the need for electron catching anodes in these regions. The electron stream in the space between the two magnetron sections at both ends of the tube can be given any desired degree of negative resistance to cause a growth in the radial push-pull space charge waves without requiring intermediate magnetron sections and their associated tuning circuits. By way of example, I might obtain negative resistance to the point of oscillation at the very closely spaced input anodes adjusted to say 30 volts and I might taper the potential up to 3000 volts on the large anodes. Suppose further that I allow the electron current at the large anodes to grow to 100 times the current on the small anodes. This results in an amplification due to potential and current growth on the order of 10,000 to 1 in power, or 40 decibels. Suppose further that the input power required to synchronize oscillations at the small anodes is 1% of the total oscillatory power built up inside the small anodes (the theoretical lower limit is about 0.5% at 1000 megacycles when the band width is 10 megacycles). This provides an additional 100 to 1 gain, or another 20 decibels.

Likewise, I might use the growing wave electron stream merely to synchronize the frequency of a powerful magnetron oscillator formed by increasing the physical size, potential, and electron emission of the large anode portion, thus making it possible to obtain another 20 decibels gain. A further important source of gain is that feeble oscillations at the input end of the tube (which cause only small percentage space charge waves there) can be made to grow to very large 100% disturbances at the output end. This might account for another 20 decibel to 40 decibel gain.

From the foregoing, it seems possible that, when fully developed, a single growing wave amplifier tube could provide all of the power gain required in a television radio relay repeater, without any need for obtaining the gain in a series of discrete steps with coupling circuits between stages.

Aside from its high frequency use, the amplifier of the invention should have very interesting possibilities for extremely wide band amplification at low frequencies, down to zero frequency or direct current.

In the tube of the invention, under suitable conditions of design and operation, a steady state unbalance in the potential of one of the small input anodes can cause a steady state unbalance of current to the large anodes, in a manner to provide an extremely large power gain.

Figure 1A:
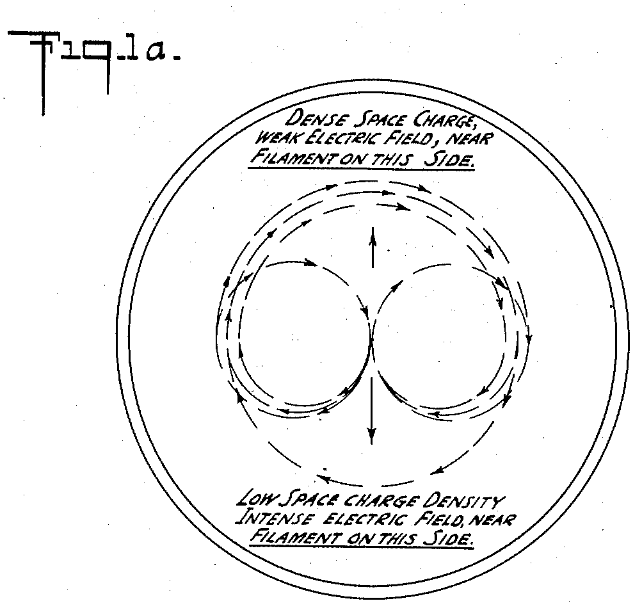

To explain this, reference will be made to Fig. 1*a* which shows how any lack of symmetry of space charge distribution around the filament tends to grow up to a limiting value, due to a negative resistance effect of the same kind which permits operation of double anode magnetrons at any low frequency down to zero or direct current. Any eccentricity in the space charge distribution around the filament tends to increase the eccentricity because the eccentricity in the space charge density produces an opposite eccentricity in the electric field near the filament. Emission pulled from the filament is greatest on the side away from the dense portion of space charge but this emission adds to the eccentricity of the space charge. This space charge eccentricity has the same regenerative effect as potential differences between anodes of the double anode magnetron.

If the tube of Fig. 1 has a circular cross-section there might be a difficulty in operation especially at low frequencies because there might exist a tendency for the plane of eccentricity to twist more or less unpredictably as we pass from one pair of anodes to the other along the axis, so that the effect of input potential difference might appear as differences in space charge density along a diameter at 90° to the desired position, at the output electrodes. To eliminate the possibility of twist, I flatten the amplifier envelope to give it a more or less elliptical cross section, with the long axis of the ellipse at right angles to the cross section of the tube shown in Fig. 1 (note Fig. 2), thereby increasing the direct current electric fields along the growing wave path in the direction of input and output potential differences, with respect to those at right angles.

It will be noted that electromagnetic feed back coupling from output to input circuit inside the tube can be extremely small in this type of amplifier, due to the large spacing between the two magnetron sections and the uncoupling effect of the coating of resistance material, and the external metal shield which serves to provide a high pass filter with a cut-off frequency above the operating frequency, which is a necessity when the gain is large. The only substantial coupling between the magnetron sections is through the action of the electron space charge. Theoretically, any very small coupling between output and input anodes could be balanced out by setting the anodes at 90° relations around the axis. This would require twisting the ellipticity of the envelope 90° from one end to the other.

Figure 3:
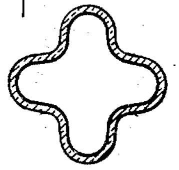
Fig. 3 shows a modification of the envelope of Fig. 2, in which the envelope is provided with multiple furrows in order to produce multiple distortions or eccentricities of the growing electron space charge.

For extremely high frequency work, such as may be needed in television and similar relay systems, the magnetic field strength required for the amplifier of Fig. 1 tends to become unreasonably large. In this case I can resort to multiple anode construction for each magnetron section and multiple furrowing of the envelope, to produce multiple distortions or eccentricities of the growing electron space charge. The cross-section of such a multiple furrowing envelope might look something like that of Fig. 3. In general, this requires correct proportioning of cathode and envelope effective diameters to give electron hops a correct circumferential angle to match the number of anode segments. This has some similarities to the expedient as described in my Patent 2,217,745, for increasing the operating frequency and peak power output of magnetron oscillators, which expedient has had considerable success in numerous applications, particularly in the radar field.

The amplifier of the invention has two modes of operation. At very high frequencies, operation will be at a frequency synchronized with the electron transit time or frequency. At lower frequencies there need be no direct relation between the operating frequency and the electron transit time and the device will respond almost aperiodically down to zero frequency or direct current. Very large gain is obtained due to the continuous growth of current and potential, and increase in percentage space charge eccentricity as the space charge moves toward the output anodes. Additional gain is provided by negative resistance effects between the anodes. From another aspect, each elemental length of the magnetron amplifier device functions in a manner similar to a double anode magnetron and acts as a control for the next adjacent elemental length which has increased potential, current and degree of space charge eccentricity.

The invention finds particular application in frequency modulation amplifier systems wherein it is desired to control the frequency of one magnetron from another magnetron of smaller energy rating, and in which a relatively large gain is desired with a minimum of coupling circuits.

The invention also may be used as a radio transmitter by adjusting the anode-to-cathode potential of the small magnetron to make it self-oscillating so that it may serve as a master oscillator for the larger magnetron. Such a transmitter may be amplitude or frequency modulated by means known in the art for modulating magnetrons.

It also may be used as a receiver and demodulator of modulated waves by making suitable adjustments and adding a modulation frequency output circuit.

An electron discharge device somewhat similar to that shown herein but having a greater number of anode segments in the output anode structure than in the input anode structure and utilizing a tapered magnetic field, for frequency conversion, is disclosed and claimed in applicant's copending application Serial No. 546,467, filed July 25, 1944.

What is claimed is:

1. An electron discharge device amplifier comprising a pair of similarly mounted spaced magnetrons of different physical size located within and near opposite ends of a single envelope, the small magnetron having a smaller energy rating than the larger magnetron, and means including a coating of resistance material on the inside of said envelope in the space between said spaced magnetrons and a source of potential coupled to opposite ends of said coating for producing a potential gradient along the length of the coating, to thereby cause the electron space charge developed in said smaller magnetron to travel toward the larger magnetron and to gradually grow in size as it approaches the larger magnetron.

2. An electron discharge device amplifier comprising a pair of spaced magnetrons of different physical size located within and near opposite ends of a single envelope, the smaller magnetron having a smaller energy rating than the larger magnetron, said magnetrons having a cathode extending through both magnetrons and the space between them, a source of input waves coupled to said smaller magnetron, an output circuit coupled to said larger magnetron, and means including a coating of resistance material on the inside of said envelope in the space between said magnetrons for causing the electron space charge developed in said smaller magnetron to travel toward the larger magnetron and to gradually grow in size as it approaches the larger magnetron.

3. An electron discharge device amplifier comprising a pair of similarly mounted and spaced magnetrons of different energy ratings located within a single evacuated envelope, said envelope having different dimensions in directions at right angles to the longitudinal axis, and means including a cathode extending between said magnetrons for causing the space charge developed in the magnetron of smaller rating to travel toward the magnetron of larger rating, whereby said space charge couples together said magnetrons, said different dimensions of said envelope serving to prevent an undesired twist in the plane of eccentricity of the space charge in the space between said magnetrons.

4. An electron discharge device comprising a pair of spaced magnetrons of different energy ratings located within a single evacuated envelope, said envelope having different dimensions in directions at right angles to the longitudinal axis, and means for causing the space charge developed in the magnetron of smaller rating to travel toward the magnetron of larger rating, whereby said space charge couples together said magnetrons, said means including a coating of resistance material on the inside of said envelope in the space between said magnetron, and a source of unidirectional current connected to spaced points on said coating for developing a potential gradient along said coating.

5. An electron discharge device in accordance with claim 3, wherein said envelope has the general shape of an ellipse in the space between said magnetrons.

6. An electron discharge device in accordance with claim 3, wherein said envelope has multiple furrows in the space between said magnetrons.

7. An electron discharge device amplifier system comprising a pair of similarly mounted spaced magnetrons within a single envelope, and means including a cathode extending between said magnetrons for causing the electron space charge developed in one magnetron to travel toward the other magnetron, whereby said electron space charge couples together said pair of magnetrons, an element coupled to said one magnetron for supplying high frequency input signals thereto, an element coupled to said other magnetron for deriving high frequency signals therefrom, and a high pass filter in the form of a shield surrounding said envelope and extending over the area between said magnetrons, said filter having a cut-off frequency higher than the frequency of operation of said amplifier system.

8. The method of amplifying a signal in an electron discharge device having a pair of spaced magnetrons within a single envelope, which comprises applying the signal to be amplified to one of said magnetrons, adjusting the magnetic field of said one magnetron to make the natural period of the electronic oscillations therein correspond to the frequency of the applied signal, developing a rotating space charge in said one of said magnetrons, causing said rotating space charge to travel toward and arrive at said other magnetron and to increase in diameter in the space between said magnetrons, and controlling a characteristic of the energy produced by said last magnetron.

9. An electron discharge device comprising a pair of magnetrons of different physical size located within a single evacuated envelope, and spaced from one another along the longitudinal axis of said envelope, the smaller magnetron having a smaller energy rating than the larger magnetron, a cathode extending through both magnetrons and the space between said magnetrons, and means for causing the electron space charge developed by said smaller magnetron to travel toward said larger magnetron and to grow in size as the space charge approaches the larger magnetron, said means including an element within said envelope and extending between said magnetrons and having a potential gradient along its length.

10. An electron discharge device amplifier comprising a pair of spaced magnetrons located within and near opposite ends of a single envelope, each of said magnetrons having an anode structure, a cathode extending through both magnetrons and the space between them, means in circuit with said anode structures and cathode for supplying a higher anode potential to one magnetron than to the other relative to said cathode, a circuit coupled to one of said magnetrons for supplying input waves thereto, and an output circuit coupled to the other magnetron.

11. An electron discharge device amplifier comprising a pair of spaced magnetrons located within and near opposite ends of a single envelope, each of said magnetrons having an anode structure, a cathode extending through both magnetrons and the space between them, means in circuit with said anode structures and said cathode for supplying a higher anode potential to one magnetron than to the other relative to said cathode, a circuit coupled to one of said magnetrons for supplying input waves thereto, and an output circuit coupled to the other magnetron, and a metallic shield surrounding both magnetrons and the space between them.

12. An electron discharge device amplifier comprising a pair of spaced magnetrons located within and near opposite ends of a single envelope, each of said magnetrons having an anode structure, a cathode extending through both magnetrons and the space between them, means in circuit with said anode structures and said cathode for supplying a higher anode potential to one magnetron than to the other relative to said cathode, a circuit coupled to one of said magnetrons for supplying input waves thereto, and an output circuit coupled to the other magnetron, a coating of resistance material on the inside of said envelope in the space between said magnetrons, and means connected to said coating for producing a potential gradient along a portion of the length of said coating with the higher potential near that magnetron to which is supplied the higher anode potential.

13. An electron discharge device amplifier comprising a pair of spaced magnetrons located within and near opposite ends of a single envelope, each of said magnetrons having an anode structure, a cathode extending through both magnetrons and the space between them, means in circuit with said anode structures and said cathode for supplying a higher anode potential to one magnetron than to the other relative to said cathode, a circuit coupled to one of said magnetrons for supplying input waves thereto, and an output circuit coupled to the other magnetron, a coating of resistance material on the inside of said envelope in the space between said magnetrons, means connected to said coating for producing a potential gradient along a portion of the length of said coating with the higher potential near that magnetron to which is supplied the higher potential, and a metallic shield surrounding both magnetrons and the space between them.

14. An amplifier comprising a large magnetron and a small magnetron located within a single evacuated envelope and spaced from each other along the axis of the amplifier, said magnetrons being similarly mounted relative to said axis, and means in circuit with said magnetrons for producing a potential gradient in the space between said magnetrons.

15. An electron discharge device amplifier system comprising a pair of spaced magnetrons of different energy ratings located within a single envelope, each of said magnetrons including an anode structure, a cathode extending between said magnetrons and effective to emit electrons over substantially the entire space between said anode structures, means coupled to said cathode for applying a potential between the anode structure of each magnetron and said cathode, means for applying high frequency input coupled to the magnetron of smaller energy rating, means coupled to said magnetron of larger energy rating for deriving high frequency output from the magnetron of larger energy rating, said amplifier including means for producing a magnetic field in each anode structure, said magnetic field and anode-to-cathode potentials having values which produce equal input and output frequencies.

16. An electron discharge device comprising a pair of spaced anode structures of different physical size located within a single envelope, a cathode extending within and between said anode structures and effective to emit electrons over substantially the entire space between said anode structures, means coupled to said cathode for applying a potential between each anode structure and said cathode, means adjacent said envelope for producing a magnetic field in each anode structure, means coupled to said anode structure of smaller size for applying high frequency signals to the anode structure of smaller size, and means coupled to said anode structure of larger size for deriving high frequency signals from the anode structure of larger size, said magnetic field and anode-to-cathode potentials having values which produce equal input and output frequencies.

17. An electron device comprising a large anode structure and a small anode structure located within a single evacuated envelope, and spaced from each other along the axis of said envelope, a cathode extending within and between said anode structures, means coupled to said anode structures and to said cathode for applying a potential difference between said anode structures and also between said anode structures and said cathode, means adjacent said envelope for applying a magnetic field to the space within and between said anode structures, and means coupled to said large anode structure for deriving alternating current energy from said large anode structure.

18. An electron device comprising a pair of magnetrons of different energy ratings similarly mounted within a single evacuated envelope and spaced from each other along the axis of the envelope, means coupled to the smaller energy rating magnetron for supplying control power thereto, means in the space between said magnetrons for producing a space charge having a gradient in said envelope to thereby couple said magnetrons together, and means coupled to the larger energy rating magnetron for taking output power therefrom.

19. An electron discharge device comprising a pair of spaced anode structures, a cathode extending within and between said anode structures and adapted to emit electrons over substantially the entire space between said anode structures, means for applying a potential between each anode structure and said cathode, means for producing a magnetic field in each anode structure, means for applying a direct current field to the space between the structures and transversely to said cathode, means for applying high frequency signals to one anode structure, and means for deriving high frequency signals from the other anode structure.

20. An electron discharge device comprising a pair of spaced segmented anode structures within a single envelope, a cathode extending through one of said anode structures and at least up to the other anode structure, means coupled to said cathode for applying a potential between each anode structure and said cathode, means coupled to one of said anode structures for applying a high frequency input thereto, means coupled to said device for deriving a high frequency output from the other anode structure, said device including means for producing a magnetic field in each anode structure, said magnetic field, and anode-to-cathode potentials having values which produce equal input and output frequencies.

21. An electron discharge device amplifier comprising a pair of segmented input and output electrode structures located within and near opposite ends of a single envelope, means coupled to said input structure for supplying a signal thereto, means in circuit with said input structure for developing a rotating electron space charge therein, and means including a coating of resistance material on the inside of said envelope in the space between said spaced electrode structures and means coupled to said coating for supplying potential to spaced points along the length of said coating for producing a potential gradient therealong, to thereby cause the electron space charge developed in said input electrode structure to travel toward the output electrode structure and to gradually grow in size as it approaches the output electrode structure.

22. An electron discharge device comprising a segmented input electrode structure, a segmented output electrode structure spaced from said first structure and of larger size, a single envelope around both of said segmented structures, means coupled to the input electrode structure of smaller size for supplying a signal thereto, means adjacent said input structure for developing a rotating space charge within said input electrode structure, direct-current field producing means within said envelope for projecting said rotating space charge with progressively increasing diameter toward said output electrode structure of larger size and for causing said space charge of increased diameter to reach said output structure, and means coupled to said output electrode structure for deriving output energy therefrom.

23. An electron discharge device comprising a pair of spaced segmental anode structures of different energy ratings, a cathode adjacent said structures, means coupled to said anode structures and said cathode for applying different potentials between said anode structures and said cathode, means adjacent said device for producing a magnetic field in each anode structure, means coupled to said structures and said cathode for applying a direct current field to the space between the structures and transversely to said cathode, means coupled to the anode structure of smaller energy rating for applying high frequency signals thereto, and means coupled to the anode structure of larger energy rating for deriving high frequency signals of the same frequency therefrom.

24. An electron discharge device comprising a segmented input electrode structure, a segmented output electrode structure of larger size spaced from said first structure, a single envelope around both of said segmented structures, means coupled to the input electrode structure for supplying a signal thereto, means adjacent said input structure for developing a rotating space charge within said input electrode structure, means within said envelope for projecting said rotating space charge toward said output electrode structure and for causing said space charge to reach said output structure, means interposed between the input and output structures for progressively changing the diameter of the rotating space charge projected toward the output structure, and means coupled to said output electrode structure for deriving output energy therefrom at the frequency of the input signal.

CLARENCE W. HANSELL.

REFERENCES CITED

The following references are of record in the file of this patent:

UNITED STATES PATENTS

| Number | Name | Date |
|---|---|---|
| D. 127,826 | Hoffman | June 17, 1941 |
| 1,716,142 | Little | June 4, 1929 |
| 2,084,867 | Prinz et al. | June 22, 1937 |
| 2,112,822 | Braden | Apr. 5, 1938 |
| 2,129,713 | Southworth | Sept. 13, 1938 |
| 2,168,296 | De Vries et al. | Aug. 1, 1939 |
| 2,241,976 | Blewett et al. | May 13, 1941 |
| 2,250,698 | Berline | July 29, 1941 |
| 2 295,315 | Wolff | Sept. 8, 1942 |
| 2,414,085 | Hartman | Jan. 14, 1947 |
| 2,428,779 | Bowen | Oct. 14, 1947 |